United States Patent [19]

Heidmann et al.

[11] 4,320,358

[45] Mar. 16, 1982

[54] GASDYNAMIC LASERS

[75] Inventors: Richard Heidmann, Vernon; Jacques P. Thieck, Paris, both of France

[73] Assignee: Societe Europeenne de Propulsion, France

[21] Appl. No.: 887,754

[22] Filed: Mar. 17, 1978

Related U.S. Application Data

[63] Continuation of Ser. No. 645,689, Dec. 31, 1975, abandoned.

[30] Foreign Application Priority Data

Dec. 31, 1974 [FR] France .................................. 7443476

[51] Int. Cl.³ ................................................ H01S 3/05
[52] U.S. Cl. .................................................... 372/90
[58] Field of Search ...................... 331/24.5 G, 24.5 P, 331/24.5 O; 330/4.3

[56] References Cited

U.S. PATENT DOCUMENTS

| | | | |
|---|---|---|---|
| 3,634,778 | 1/1972 | Melikian et al. | 331/94.5 G |
| 3,641,453 | 2/1972 | Biancardi et al. | 331/94.5 G |
| 3,886,477 | 5/1975 | Ruby et al. | 331/94.5 G |
| 3,886,478 | 5/1975 | Milling | 331/94.5 G |
| 4,171,518 | 10/1979 | Denner, Jr. et al. | 331/94.5 M |
| 4,206,429 | 6/1980 | Pinsley | 331/94.5 P |

*Primary Examiner*—William L. Sikes
*Assistant Examiner*—Léon Scott, Jr.
*Attorney, Agent, or Firm*—Poms, Smith, Lande & Rose

[57] ABSTRACT

There is described a method and apparatus comprising a gasdynamic laser wherein the main gas flow is introduced into a chamber and heated therein and a secondary gas flow is injected into the heated main gas flow so as to produce laser emission, characterized in that the main gas flow, before being introduced into the chamber, is preheated to a temperature preferably above 500° K°.

15 Claims, 3 Drawing Figures

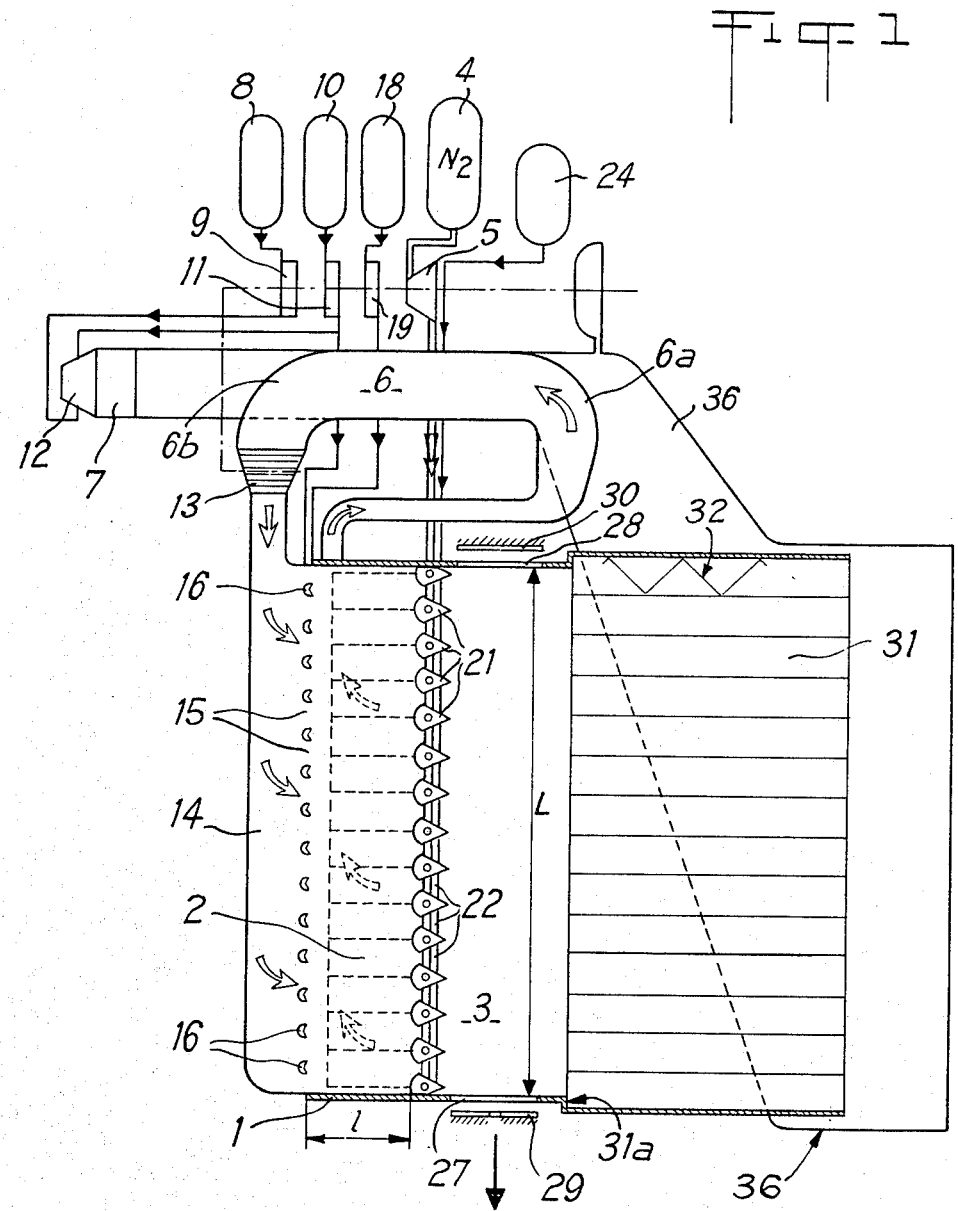

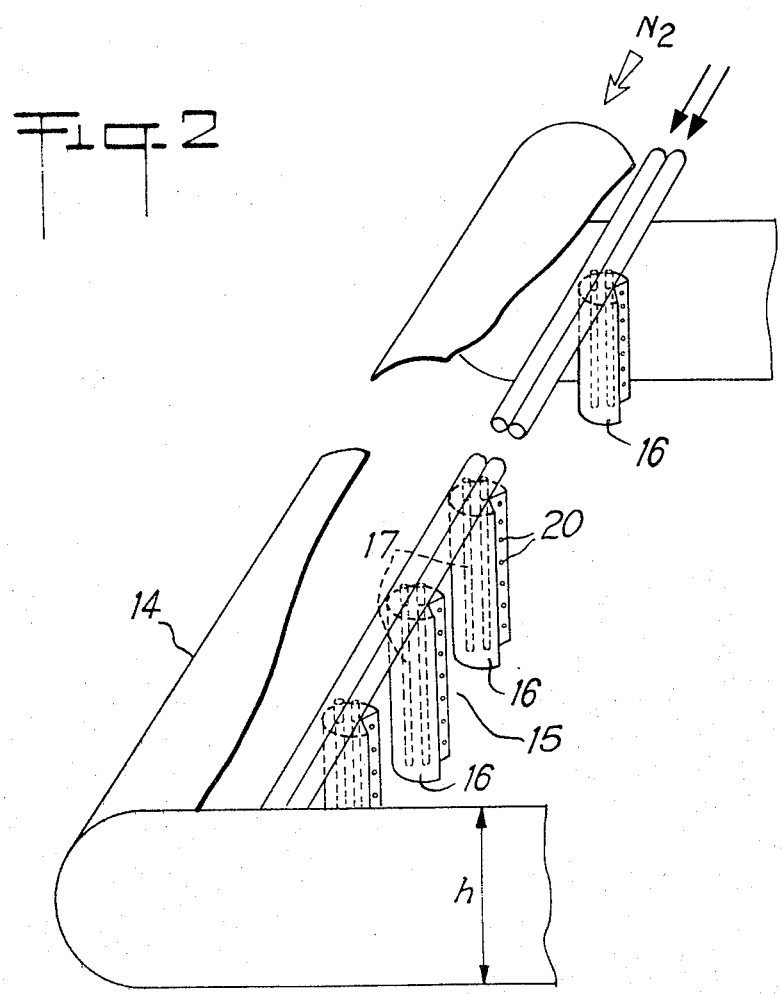

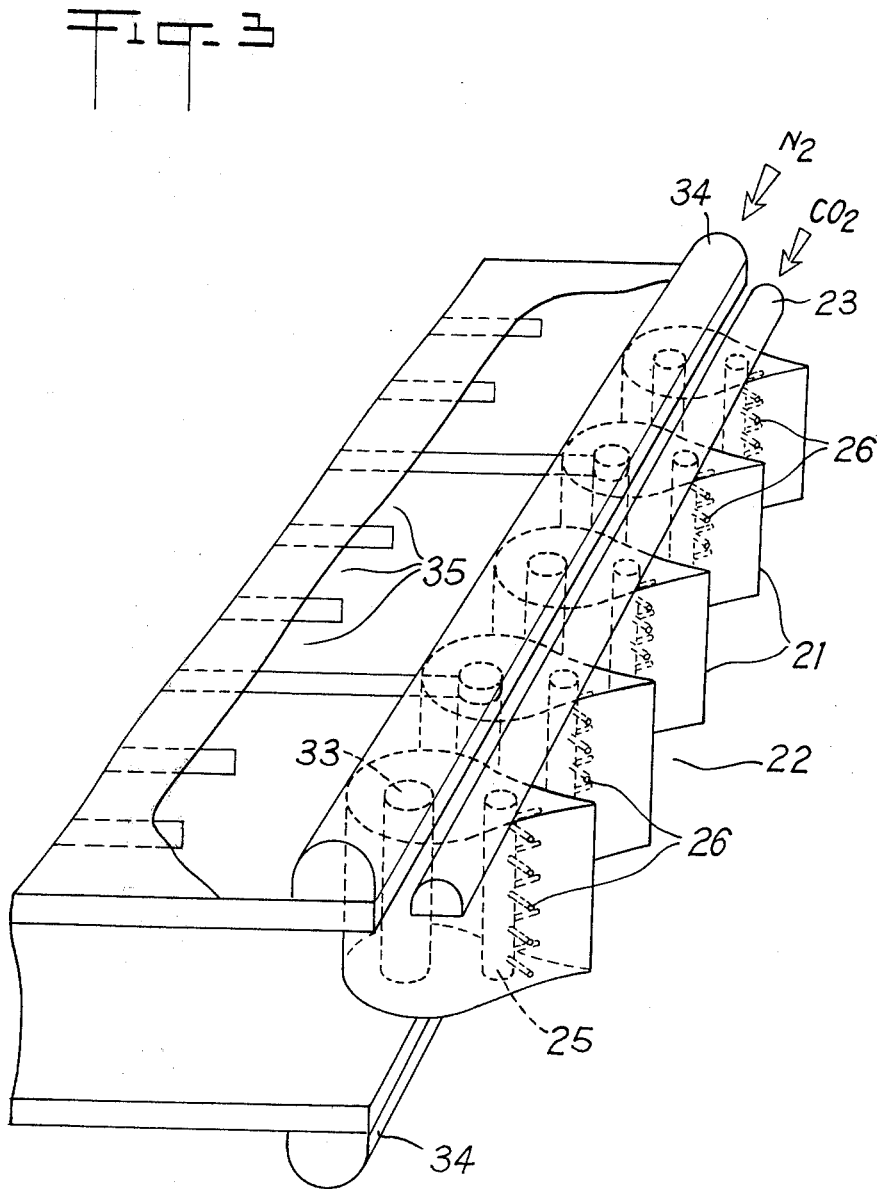

GASDYNAMIC LASERS

This is a continuation, of application Ser. No. 645,689 filed Dec. 31, 1975 and now abandoned.

The invention relates to a gasdynamic laser.

In some known gasdynamic lasers, molecules of a main gas flow, usually nitrogen ($N_2$) are excited or thermally or electrically pumped, the vibrational energy carried by the main gas flow being transferred to a secondary gas flow usually containing carbon dioxide ($CO_2$) and adapted to produce continuous, powerful laser emission in a resonant cavity.

When the molecules of the main gas flow are excited by an electric discharge in the gas flow, electric generator circuits have to be used in order to obtain powerful laser emission. The circuits need to be bulky and complex if it is desired to obtain high levels of emitted power.

It has also been proposed to excite the molecules of the main gas flow by a thermal method, using the heat liberated by an exothermic chemical reaction (which can if required generate one of the gas flows). In this case the power and efficiency are affected by the presence of substances (or effluents) resulting from the exothermic reaction. If the proportion of these substances is relatively high, they have an undesirable effect on the secondary gas flow.

An object of the invention is to provide a gasdynamic laser which has relatively reduced mass and bulk, is efficient, and can deliver very high power levels, e.g. of the order of a megawatt. Of course this power is limited by manufacturing requirements, inter alia relating to the resonant cavity.

This object is obtained by a method wherein the main gas flow introduced into a chamber is vibrationally excited and a secondary gas flow adapted to produce laser emission is injected into the excited main gas flow; according to the invention the method comprises a stage wherein the main gas flow is preheated, before being introduced into the chamber, to a temperature preferably above 500° K. The preheated main gas flow can subsequently be excited either chemically, by introducing into the chamber at least one substance capable of reacting exothermically therein so as to bring the main gas flow to a temperature preferably above 2000° K., or electrically by producing an electric discharge in the chamber or simultaneously by chemical and electrical methods.

The same object is attained by gasdynamic laser comprising a chamber, means for introducing the main gas flow thereinto, means for exciting the main gas flow, means for injecting a secondary gas flow into the chamber, and an optical resonant cavity in which laser emission can be produced, the laser also comprising, according to the invention, means for preheating the main gas flow, the means being disposed upstream of the chamber and adapted to bring the main gas flow to a temperature preferably above 500° K. before it is introduced into the reaction chamber.

The main gas flow can be preheated to a very high temperature, of the order of 2000°–3000° K., in the chamber, thus obtaining very high power levels with satisfactory efficiency.

According to one feature, the preheating is brought about in an exchanger by exchanging heat with a hot fluid. The hot fluid can be the gases resulting from an exothermic chemical reaction or the gases from a turbojet.

Advantageously the chamber walls and the means for injecting the secondary gas flow are cooled by circulating the main gas flow before it is preheated, thus raising the temperature of the main gas flow.

According to another feature, a gas compressor can be provided in the main gas flow circuit upstream of the chamber, so as to compress and raise the temperature of the main gas flow. The gas compressor can be associated with the heat exchanger, in which case it is preferably disposed downstream thereof. Alternatively, the gas flow can be preheated simply by conveying it through the chamber cooling circuit and the means for injecting the secondary gas flow, and by sending it into the compressor.

The electric energy for exciting the main gas flow preheated by an electric discharge may be provided by a turbine, advantageously driven by the hot fluid from the exchanger; this both reduces the bulk of the laser and recovers part of the energy of the fluid.

When the main gas flow is excited by an exothermic chemical reaction, the flow can be preheated so as very substantially to reduce the proportion of effluents produced during the reaction and thus, compared with a laser in which the main flow is not preheated, obtain a higher power in the laser beam without affecting the final temperature of the main flow in the chamber or the flow rate of gas into the resonant cavity.

Other features and advantages of the invention will be clear from the description of an embodiment thereof, given nonlimitatively by way of illustration and referring to the accompanying drawings in which:

FIG. 1 is a general diagrammatic view of a laser according to the invention, wherein the main gas flow is excited by chemical heating;

FIG. 2 is a partial diagrammatic view of the reaction compartment of the laser in FIG. 1, and FIG. 3 is a partial diagrammatic view of the circuit for cooling the chamber and the system of inversion and injection pipes in the laser in FIG. 1.

The laser illustrated in FIG. 1 comprises a chamber 1 containing a reaction compartment 2 and an optical resonant cavity 3. The main gas flow, e.g. nitrogen ($N_2$) is stored in liquid form in a vessel 4 and pumped therefrom by a pump 5 so as to be introduced under pressure into the reaction chamber.

According to the invention, the nitrogen is preheated, e.g. in a heat exchanger 6, before being introduced into chamber 2. The heat exchanger can comprise a number of flat boxes made e.g. of sheets of metal alloy or refractory material and spaced apart by reinforcing members and prolonged by two tubes 6a, 6b for admitting and discharging the nitrogen to be preheated. The heat exchange occurs through the sheet-metal walls of the boxes, nitrogen flowing in one direction in alternate boxes and a hot fluid from a source 7 flowing in the other direction in the other boxes.

In the example illustrated, the source is a hot-gas generator comprising a combustion chamber into which the following are introduced: ergols such as kerosene stored in a vessel 8 and injected into a combustion chamber by a pump 9, and nitrogen peroxide ($N_2O_4$) stored in a vessel 10 and injected by a pump 11. The combustion chamber is cooled by means (not shown) and is preferably provided with a feed regulator 12 for the ergols into the combustion chamber, so as to control the pressure of the combustion gases and maintain it at a value approximately equal to that of nitrogen in exchanger 6 so as to prevent the sheet metal forming the boxes from being excessively deformed during starting and stopping, owing to a great difference between the pressures of the nitrogen and of the combustion gas. Alternatively, the source of hot gases can be a turbojet.

Advantageously the preheated nitrogen from exchanger 6 is compressed by a gas compressor 13 before being introduced into compartment 2, thus raising the nitrogen temperature e.g. by approximately 200° to 300° C.

The preheated nitrogen is introduced into compartment 2 by a duct 14 (FIG. 2) opening into the compartment through orifices 15 each disposed between two adjacent injectors 16 supplying substances such as ergols adapted to react exothermically in compartment 2. Injectors 16 are disposed in at least one line and are each provided with channels 17 connected to a reactant-supplying device comprising a storage vessel 18 (e.g. containing cyanogen ($C_2N_2$) and a supply pump 19, and a storage vessel containing e.g. nitrogen peroxide and a supply pump, e.g. vessel 10 and pump 11. Of course, other reactants may be used provided that they are adapted to react exothermically and the proportion of effluents is acceptable. Channels 17 communicate with compartment 2 via a number of orifices 20 provided in the walls of injectors 16 and disposed e.g. so that the two streams of reactants entering compartment 2 are directed towards one another. The shape of compartment 2 is parallelepipedal; two of its dimensions, the width L and the height h, are determined by the shape of the resonant cavity 3 prolonging compartment 2, and the third dimension (the depth l) is determined in dependence on the flow rate of nitrogen in compartment 2, allowing for the time required for the reactants to react and to mix with nitrogen. Preferably, injectors 16 are disposed adjacent to that wall of compartment 2 which is furthest from the resonant cavity, so that the depth l of chamber 2 is relatively small while still ensuring homogeneous mixture and thermodynamic equilibrium between the nitrogen and the effluents. Injectors 16 are cooled by a flow of reactants in channels 7.

A number of cylindrical sectional members 21 extending perpendicular to the flow direction of the gas out of compartment 2 are disposed between compartment 2 and cavity 3. Members 21 are e.g. aligned in a direction perpendicular to the flow direction. The spaces between each pair of members 21 form channels 22 which are considerably flared in the direction of cavity 3. At least one pipe 23 (FIG. 3) is connected upstream to a storage vessel 24 containing a secondary gas flow, inter alia carbon dioxide ($CO_2$) and helium if required, and is connected downstream to channels 25 formed longitudinally in members 21. Channels 25 supply a secondary gas flow to a number of orifices 26 which open laterally into the walls of pipes 22.

After traveling through pipes 22, the gases travel through the optical resonant cavity 3, which has a parallelepipedal shape prolonging that of compartment 2, and in known manner is provided with two windows 27, 28 in opposite walls of the cavity, at least two mirrors 29, 30 being disposed behind the windows. One mirror (29) is provided e.g. with a central aperture for the purpose of laser emission (arrow F in FIG. 1).

Since the gases expand considerably during their travel in pipes 22, the pressure in the resonant cavity is below atmospheric pressure. Accordingly, cavity 3 is prolonged, in the flow direction of the gases through it, by a parallelepipedal gas diffuser 31 having a cross-section slightly greater than that of cavity 3. Diffuser 31 is connected to cavity 3 by stepped portions 31a of its walls, which start shock waves 32 in the diffuser so as to recompress the gases coming from cavity 3. Preferably the diffuser interior is partitioned to form a number of cylindrical tubes of rectangular cross-section extending parallel to the gas flow direction so as to reduce the length of the shock waves and thus reduce the length of the diffuser.

For example, FIG. 3 illustrates a circuit for cooling the walls of compartment 2 and members 21. In the example, cooling is provided by a flow of nitrogen pumped from the storage vessel before being preheated. Members 21 are formed with cooling channels 33 parallel to channels 25, channels 33 being connected upstream to pump 5 via two tubes 34, which are used for reversing the flow direction of nitrogen in successive members 21.

The cooling channels 33 supply cooling ducts 35 which are formed in the walls of the reaction compartment 2 and preferably form at least the main inner walls thereof, i.e. the inner walls parallel to the flow direction of the gases in the compartment, the width of the walls being L and the depth l. The nitrogen from channels 33 flows in ducts 35 in the opposite direction to the gas flow in compartment 2 and, since the flow direction of nitrogen alternates in successive channels 33, nitrogen is symmetrically introduced into the ducts 35 of the main walls of compartment 2, thus uniformly cooling these walls. Of course, the other two walls of compartment 2 parallel to the flow direction of the gases therein can also be cooled by providing them with cooling ducts similar to ducts 35.

Since the tubular members 21 and the walls of compartment 2 are cooled by the main gas flow, the temperature thereof can be raised. Alternatively, a different cooling fluid can be used, or independent cooling circuits may be used for members 21 and the walls of compartment 2.

The aforementioned laser operates substantially as follows. When pumps 5, 9, 11, 19 and compressor 13 are actuated, source 7 produces hot gases which, after flowing in exchanger 6, are ejected into a discharge duct 36. The nitrogen pumped into vessel 4 flows under pressure and at a high rate into the circuit cooling the tubular members 21 and the walls of compartment 2, and then flows into exchanger 6 and is introduced into compartment 2. The reactants entering chamber 2 react and heat the nitrogen, which is reversed owing to rapid expansion during its travel through pipes 22, where it mixes with the secondary gas flow. The carbon dioxide gas molecules are vibrationally excited by resonant active laser gas medium first travels through cavity 3 at low static pressure and high speed, thus producing laser emission, and then escapes to atmosphere after being recompressed in diffuser 31.

The nitrogen is preheated in exchanger 6 to preferably the highest possible temperature, allowing for the refractory material used to construct the exchanger. The preheating temperature may be of the order of 700° to 1200° K. and the refractory material can be a sheet of a known alloy, French Standard KC 20 W N. Alloy KC 20 W N is defined by French Standard AIR 9.165 and has an elemental composition, by weight of: 0.05% to 0.15% C., less than 0.3% Si, 1% to 2% Mn, 19% to 21% Cr, 9% to 11% Ni, less than 3% Fe, 14% to 16% W, less than 0.015% S and less than 0.015% P, B and Co;

this alloy corresponds substantially to the alloy according to the U.S. standard HS 25 (HAYNES) which has a composition, by weight of: 0.05% to 0.15% C, less than 1% Si, 1% to 2% Mn, 19% to 21% Cr, 9% to 11% Ni, less than 3% Fe, 14% to 16% W, less than 0.03% S and less than 0.03% P, B and Co. The nitrogen from exchanger 6 is compressed in compressor 13, thus raising its temperature by approximately 200° to 300° C. It can then be heated in the reaction chamber to a temperature above 2000° K., up to 2500°–3000° K. The nitrogen enters the reaction compartment at a relatively high temperature, and thus limits the proportion of reaction products from the reactants in compartment 2, inter alia the proportion of carbon monoxide (CO), which is liable to have an adverse effect if its quantity is large. Thus, it is preferable to introduce nitrogen into chamber 2 at a temperature above 500° K.

As already mentioned, the temperature of the main flow can be raised to 500° C., simply by conveying it through the circuit cooling the walls of compartment 2 and members 21 and compressor 13. However, it is preferable to use exchanger 6 so as to obtain a maximum preheating temperature.

As already mentioned, the static pressure of the gases traveling through the resonant cavity is below atmospheric pressure (of the order of 0.1 to 0.2 bar) and the gases are recompressed by a diffuser. If the static pressure is relatively low, it may be desirable, initially, to start up the diffuser by producing a negative pressure therein. This can be done by causing the diffuser to open into the hot gas discharge duct 36, so that the diffuser atmosphere can be carried away by these hot gases. To this end, the speed of the combustion gases in duct 36 is increased to a suspension value, by providing a constriction or sonic throat in duct 36 upstream of the place where it is connected with the diffuser. To prevent the resulting negative pressure on starting from propagating too far upstream in the nitrogen flow, a stop valve is provided in the flow, e.g. immediately upstream of the cooling circuit of member 21 and the walls of compartment 2.

The storage and supply assembly, which comprises vessels 4,8,10, 18, 24 and pumps 5, 9, 11, 19, also comprises means for controlling and regulating the flow rate and pressurization means for storage in the liquid phase, inter alia for nitrogen, kerosene, and nitrogen peroxide (these means are not shown).

Means are also provided for driving pumps 5, 9, 11, 19 and compressor 13. The drive means may be either a motor supplied by an auxiliary energy source or a turbine supplied by an auxiliary gas generator, or advantageously a turbine such as 37 supplied by combustion gases taken from the discharge duct 36.

In the aforementioned laser, the molecules of the main gas flow in compartment 2 are excited by chemical heating. As already mentioned, however, excitation may be produced electrically. In the latter case, compartment 2 is supplied not with means supplying reactants but with at least two electrodes connected to a source of electrical energy and adapted to produce an electric discharge in the main gas flow entering the chamber. The necessary electric energy may advantageously be provided by a machine such as an alternator coupled to turbine 37. Alternatively, the main gas flow can be simultaneously energized by chemical and electrical means, in which case compartment 2 will be provided with means supplying reactants and with electrodes.

Of course, other modification or additions can be made to the aforementioned device without thereby departing from the invention.

We claim:

1. A method of heating an energizing gas in a gasdynamic laser, comprising:
preheating said energizing gas by heat exchange to a temperature above 500° K.;
introducing said preheated gas into a heating chamber at a temperature above 500° K.; and
heating said preheated gas in said heating chamber; mixing said heated gas with a lasing active gas.

2. A method as set forth in claim 1 wherein said preheated energizing gas is heated at least partially by heat produced by an exothermic reaction in said heating chamber.

3. A method as set forth in claim 1 wherein said energizing gas is preheated at least partially by indirect heat exchange with a hot fluid.

4. A method as set forth in claim 3 wherein said energizing gas is preheated by passing the energizing gas through cooling channels for cooling the heating chamber wall.

5. A method as set forth in claim 3 wherein said energizing gas is preheated by passing the energizing gas through a heat exchanger supplied with hot combustion gases.

6. A method as set forth in claim 5 including the step of accelerating said combustion gases through a discharge duct downstream of said heat exchanger to assist the discharge of the laser output gas through a diffuser opening in said duct.

7. A method as set forth in claim 1 including compressing said energizing gas prior to its introduction into the heating chamber.

8. A gasdynamic laser comprising:
a source of energizing gas;
a heating chamber;
conduit means for flowing energizing gas from the source of energizing gas to the heating chamber;
a source of lasing active gas;
means for injecting the lasing gas into the heating chamber; and
a resonant cavity;
wherein said conduit means comprises a heat exchanger located between said source of energizing gas and the heating chamber which preheats the energizing gas and introduces preheated energizing gas into the heating chamber at a temperature above 500° K.

9. A gasdynamic laser as set forth in claim 8, having a reaction compartment within said heating chamber and reactant supply means connected to said reaction compartment for supplying thereto at least one chemical substance adapted to react exothermically therein.

10. A gasdynamic laser as set forth in claim 9 further comprising cooling ducts in the reaction compartment wall, said cooling ducts being in gas communication with said energizing gas source.

11. A gasdynamic laser as set forth in claim 8 wherein said heat exchanger is connected to said energizing gas source and to a hot fluid source, said hot fluid source comprising a combustion compartment and means for injecting thereinto at least one substance capable of reacting therein and producing hot combustion gases.

12. A gasdynamic laser as set forth in claim 11 further comprising a discharge duct means for discharging said combustion gases downstream of said heat exchanger, gas accelerating means in said discharge duct for accelerating said gas, and a diffuser in fluid communication with said resonant cavity and opening into said discharge duct downstream of said gas accelerating means, for assisting the discharge of the laser output gases through said diffuser.

13. A gasdynamic laser as set forth in claim 11 further comprising a turbine located downstream of said heat exchanger and which is supplied with said combustion gases.

14. A gasdynamic laser as set forth in claim 8 wherein said lasing gas injecting means comprises:

a plurality of cylindrical lasing gas injectors each having at least one channel connected to said lasing gas source and a plurality of openings in fluid communication with each channel; and a cooling duct, said cooling duct being connected to said energizing gas source for cooling said lasing gas injectors by the energizing gas flowing upstream of said heating chamber.

15. A gasdynamic laser as set forth in claim 8 further comprising a gas compressor located in the path of said energizing gas upstream of the heating chamber.

* * * * *